(12) United States Patent
Graf

(10) Patent No.: US 8,741,132 B2
(45) Date of Patent: Jun. 3, 2014

(54) DEVICE FOR CATCHING RAINWATER

(75) Inventor: Otto P. Graf, Teningen (DE)

(73) Assignee: Otto Graf GmbH, Teningen (DE)

( * ) Notice: Subject to any disclaimer, the term of this patent is extended or adjusted under 35 U.S.C. 154(b) by 353 days.

(21) Appl. No.: 13/150,407

(22) Filed: Jun. 1, 2011

(65) Prior Publication Data

US 2011/0315610 A1    Dec. 29, 2011

(30) Foreign Application Priority Data

Jun. 23, 2010   (EP) .................................... 10006552

(51) Int. Cl.
    *E04D 13/08*    (2006.01)
(52) U.S. Cl.
    USPC ................... 210/170.03; 210/162; 210/433.1; 210/462; 210/447; 137/357; 137/547; 52/16; 52/12
(58) Field of Classification Search
    CPC ..................................... E02B 3/02; E02B 3/03
    USPC ......... 210/462, 249, 162, 170.03, 463, 433.1, 210/459, 475, 447, 449, 446; 52/12, 16; 285/203, 204, 208; 137/357, 546, 550, 137/547
    See application file for complete search history.

(56) References Cited

U.S. PATENT DOCUMENTS

| | | | |
|---|---|---|---|
| 2,798,613 A * | 7/1957 | Tinker ............................ | 210/446 |
| 3,322,442 A * | 5/1967 | Flachbarth ..................... | 285/208 |
| 3,481,366 A * | 12/1969 | Mortonson .................... | 137/873 |
| 4,182,376 A * | 1/1980 | Nilsson ......................... | 137/874 |
| 4,722,794 A * | 2/1988 | Duncan ......................... | 210/432 |
| 5,406,966 A * | 4/1995 | Lepkowski et al. ........ | 134/104.4 |
| 5,490,538 A | 2/1996 | Marcel et al. ................. | 137/357 |
| 5,863,151 A * | 1/1999 | Chapotelle ..................... | 405/52 |
| 5,985,158 A * | 11/1999 | Tiderington ................... | 210/767 |
| 7,550,077 B2 * | 6/2009 | Graf .............................. | 210/162 |
| 2001/0035371 A1* | 11/2001 | Priggemeyer et al. ........ | 210/162 |
| 2003/0051414 A1* | 3/2003 | Bessette ........................... | 52/16 |
| 2008/0086953 A1* | 4/2008 | Graf ................................ | 52/12 |

FOREIGN PATENT DOCUMENTS

| | | |
|---|---|---|
| GB | 908311 | 10/1962 |
| GB | 2248262 | 4/1992 |
| GB | 2430015 | 3/2007 |

* cited by examiner

*Primary Examiner* — David C Mellon
(74) *Attorney, Agent, or Firm* — Fattibene and Fattibene LLP; Paul A. Fattibene

(57) ABSTRACT

Device (V) for catching rainwater from a downpipe (F) comprising an opening (11), a branch pipe (5) with a sickle-shaped water-catching blade (12) comprising two halves at the end, a support member (1) traversed by the branch pipe (5) and a retainer. The branch pipe (5) engaging into the opening (11) with the water-catching blade (12) placed in the downpipe, and wherein the downpipe (F) can be fixed in the area of the support member (1) covering the opening (11) by means of the retainer (H). The retainer (H) comprises at least one undercut engagement hook (17) that can be passed through the opening (11), and an engagement hook tensioning system (S) interconnected between the support member (1) and the engagement hook (17).

13 Claims, 3 Drawing Sheets

A-A

1

DEVICE FOR CATCHING RAINWATER

FIELD OF THE INVENTION

The invention relates generally to a device for catching rainwater from a downpipe, and more particularly to an easily insertable, removable, and adjustable device for catching rainwater.

BACKGROUND OF THE INVENTION

In the generic device known from EP 0 625 228 B, corresponding to U.S. Pat. No. 5,490,538, the support member formed as a pipe clamp interrupted in the circumferential direction at the same time serves as a connection-establishing retaining means of the device at the downpipe. The branch pipe is inserted into the opening in the downpipe with the catching blade ahead. The support member formed as a pipe clamp is clamped onto the periphery of the downpipe to position the device on the downpipe. The support member is formed with a noncircular cross-section so that projections formed at the plug-in pipe provide an anti-rotation device. For additionally positioning and sealing purposes, a pipe socket is formed on the support member, into which said pipe socket the branch pipe is inserted. The assembly of the device at the downpipe is complex. The retaining effect of the open pipe clamp is unsatisfactory. The device substantially only fits for a determined downpipe dimension.

A device known from GB 2 248 262 A is fixed directly within the assembly and branching opening of the downpipe by positive insertion without the aid of a support member until the water-catching blade abuts at the contact position disposed at the interior wall of the downpipe and snap tabs disposed at the root of the water-catching blade engage behind the edge of the assembly and branching opening.

SUMMARY OF THE INVENTION

The invention is based on the object of providing a conveniently mountable, reliably positionable device for catching rain water which can possibly be used universally for different downpipe dimensions.

The object is solved by the following features.

Since the retaining means comprising the at least one undercut engagement hook interacts substantially only with the mounting and branching opening of the downpipe and enables to reliably fix the device through the tensioning system, one and the same device can universally be used with different downpipe dimensions. The attachment of the device is convenient and can be carried out by untrained persons. A strong engagement connection can be generated via the at least one engagement hook and the tensioning system, said engagement connection being responsible for a safe positioning of the device on the downpipe and which also generates a reliable sealing. The device can also be attached to downpipes, which are accommodated in a sunk manner in building niches, since manipulation only has to take place in the opening region. The respective engagement hook is provided at an insertion end of a sleeve receiving the branch pipe. The sleeve, which can solidly be anchored at the downpipe, properly supports the plug-in pipe so that the catching blade properly remains positioned in the downpipe also at larger flow forces. Practically, the tensioning system comprises a spigot nut engageable at the support member, said spigot nut engaging the sleeve via a bayonet or screw connection. By twisting the spigot nut, the sleeve is braced against the support member via the bayonet or screw connection such that the engagement hooks form a solid form fit with the downpipe. As an alternative the tensioning system comprises a preferably preloaded tension spring arrangement supported at the sleeve opposing the support member, and a spring abutment adjustable on the sleeve and engageable at the support member. The tensioning system automatically provides its locking effect thanks to the tension spring arrangement as soon as the engagement hooks were inserted through the mounting and branching opening of the downpipe and engage behind the interior wall of the downpipe.

Each engagement hook preferably comprises a front mounted insertion ramp so that each engagement hook can be inserted by mere insertion through the mounting and branching opening of the downpipe and resiliently engages with its undercut behind the interior wall of the downpipe.

In a purposeful embodiment of the subject matter of the invention at least two undercut and spring-elastic engagement hooks are provided in the circumferential direction of the opening of the downpipe. The at least two engagement hooks preferably define in not deformed state an external width that is larger than the clear width of the mounting and branching opening of the downpipe to generate a stable form fit with the downpipe as soon as being inserted through the opening, said form fit being secured by the tensioning system.

In a preferred embodiment a form fit anti-rotation device at least for the branch pipe is provided that is independent of the mounting and branching opening. The anti-rotation device ensures the proper positioning of the catching blade within the downpipe, wherein the mounting and branching opening can be a simple cut-out round bore. The anti-rotation device is preferably integrated into the tensioning system and is predetermined concerning its securing effect by the manufacturer of the device so that the fitter only has to cut a simple opening and does not have to pay attention to the anti-rotation device.

In a further purposeful embodiment, a filter and/or metering device is incorporated into the branch pipe, preferably comprising a filter and/or metering pot with a removable lid and, possibly, comprising a coarse filter element. In this manner a filter or metering function can selectively be used or both functions can be used, if needed. The metering function suitably enables the adjustment of the rainwater tapping.

It can be useful if the filter and/or metering device is manually movable between an fully open running position and a locking position, and preferably comprises a metering skirt twistable by means of the lid. The lid has a double function, since on the one hand it enables, if existing, the cleaning or replacement of the filter element, and on the other hand it is useable for the adjustment of water tapping.

The catching blade that can be inserted by the resetting deformation through the sleeve and the mounting and insertion opening is usefully a sickle-shaped shell, which occupies only a predetermined cross section within the downpipe and which promotes the discharge of larger soiling, such as leaves etc., through the downpipe. On the other hand, the shell can catch rainwater with favorable flow conditions and guide it into the branch pipe. One type of a catching blade fits into different downpipes.

In a purposeful embodiment, each engagement hook is arranged at a tongue, which is limited on both sides by longitudinal slots in the insertion end of the sleeve. The tongue facilitates resiliency of the engagement hook when being guided through the mounting and branching opening and also generates the required resetting force for establishing the positive fit of the engagement hook. The engagement hook can, since the tongue is spring-elastic, be formed in a very stable manner without affecting convenience during assembly of the device.

In a purposeful embodiment the support member can have a concave abutment surface having substantially the downpipe outside curvature, and on the side opposing the abutment surface it can have a pipe socket extending a through opening of the support member for receiving the sleeve. It can be useful if at least one projection, preferably a longitudinal rib is provided on the inner circumference of the pipe socket and/or the through opening of the support member, said projection being placed in a predetermined relative position to the abutment surface curvature and being engageable into a longitudinal slot of the sleeve for the anti-rotation engagement, wherein the rib is insertable either directly into a longitudinal slot of the insertion end or between two adjoining engagement hooks and which establishes an engagement acting in the circumferential direction as an anti-rotation means. In this manner the sleeve with the engagement hooks can be mounted in a predetermined rotary position.

In order to secure also the branch pipe and thus the catching blade against rotation, it is useful if coupling elements that can be brought into a mutual anti-rotation engagement are provided at the sleeve and the branch pipe. In the anti-rotation function the positive locking fit and the non-positive connection is used that the engagement hooks establish via the tensioning system with the downpipe. If the support member has a concavely curved abutment surface, the abutment surface generates in the mounted state of the device a further positive fit with the downpipe, however, only in a relatively limited range of the exterior side of the downpipe. This further positive fit can profitably also be utilized for a proper prevention of rotation. As an alternative or in addition to a concavely curved abutment surface, a relatively strong seal can be formed at the support member that is possibly formed as a planar plate, said plate sealing around the mounting and branching opening and compensates for different exterior curvatures of the downpipe in the case of different downpipe dimensions so that the device can universally be used for different downpipe dimensions and even for square downpipes.

In a purposeful embodiment each engagement hook extends in the circumferential direction over approx. 12% of the circumference of the sleeve. In this manner, large power transmission surfaces are created. In an especially purposeful manner, two diametrally opposing engagement hook pairs are provided at the sleeve, which on the whole occupy approximately half of the circumference of the sleeve. The device is purposefully mounted such that an engagement hook pair is disposed at the top and the other one is disposed at the bottom so that the device is supported in a very stable manner in the direction of the force of gravity.

In order to be able to conveniently assemble and disassemble the device, it can be useful if each shell half of the sickle-shaped catching blade is connected to the branch pipe via a bending-notch structure. The bending-notch structure allows the convenient deformation of the shell halves during insertion or removal without a risk of damage to the catching blade. The branch pipe can be formed continuously in one piece, e.g. up to a discharge connection, or it can usefully be formed of pipe sections telescopically plugged into each other, one of which comprising the collecting blade and the other one of which comprising the filter and/or metering pot.

BRIEF DESCRIPTION OF THE DRAWINGS

Embodiments of the subject matter of the invention are explained in detail by means of the drawings.

DETAILED DESCRIPTION OF THE PREFERRED EMBODIMENTS

Figure 1:
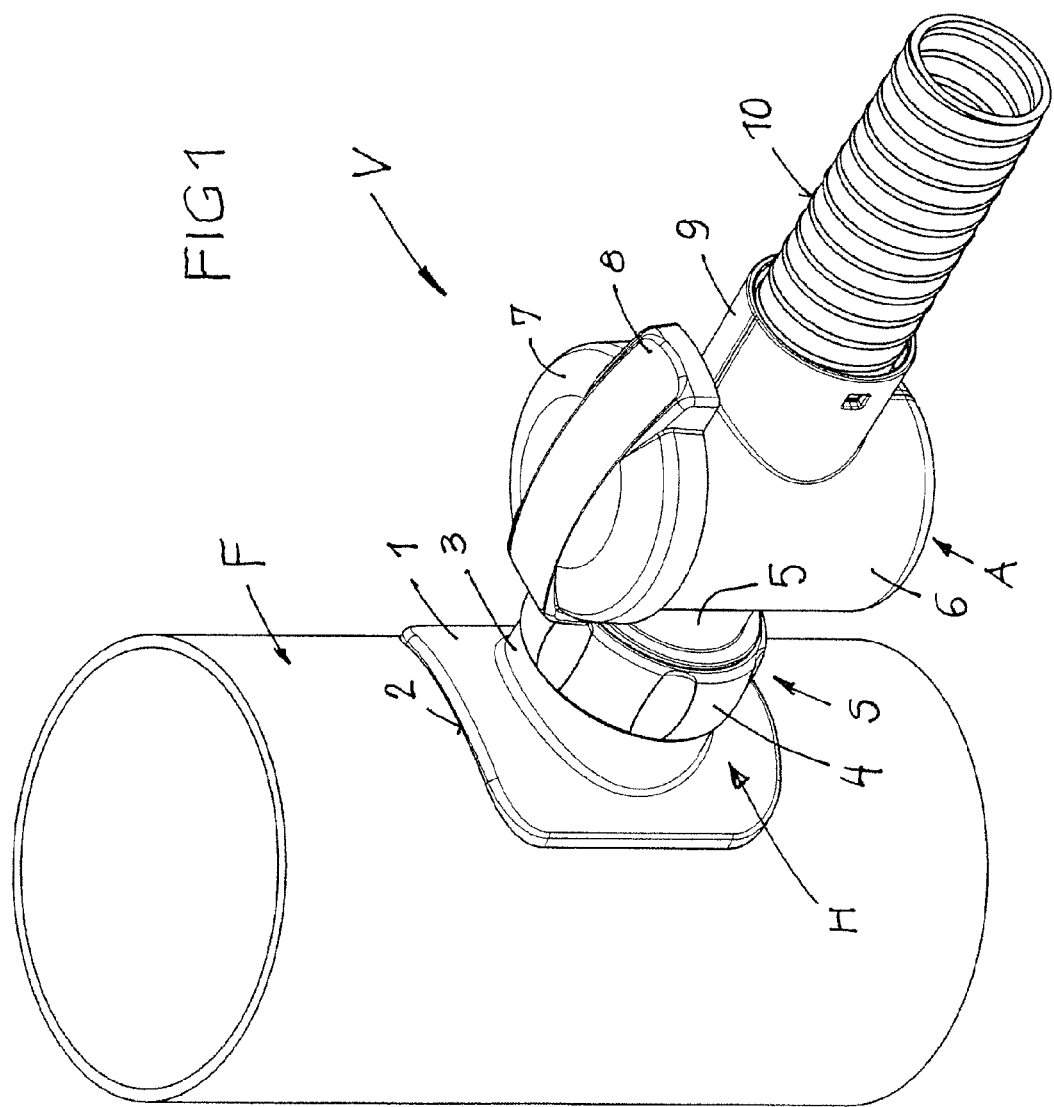
FIG. 1 is a perspective view of a device for catching rain water mounted on a downpipe.

FIG. 1 shows a downpipe F, e.g. a rainwater downpipe at a building, at which a device V for catching and branching-off rainwater from the downpipe F is mounted. The device V, whose components are suitably made of plastics, has a plate-shaped support member 1 comprising an abutment surface 2 which in the embodiment shown is rounded concavely (partially cylindrically), wherein an outwardly pointing pipe socket 3 is fixed to the support member 1. The device V includes a retaining means H comprising a tensioning system S for mounting and fixing the device V at the downpipe F. In the embodiment shown in FIG. 1 the tensioning system S has a spigot nut 4, from which a branch pipe 5 projects. In the course of the branch pipe 5, a filter and/or metering device A is (optionally) arranged, from which a discharge piece 9 projects, possibly at an inclination, in which a discharge hose 10 is arranged. Concerning the filter and/or metering device 10, FIG. 1 shows a filter and/or metering pot 6, incorporated for instance into the branch pipe 5, a removable and/or at least rotational lid 7 and a handle 8 at the lid 7. The support member 1 may also be a planar plate or an annular flange.

Figure 2:
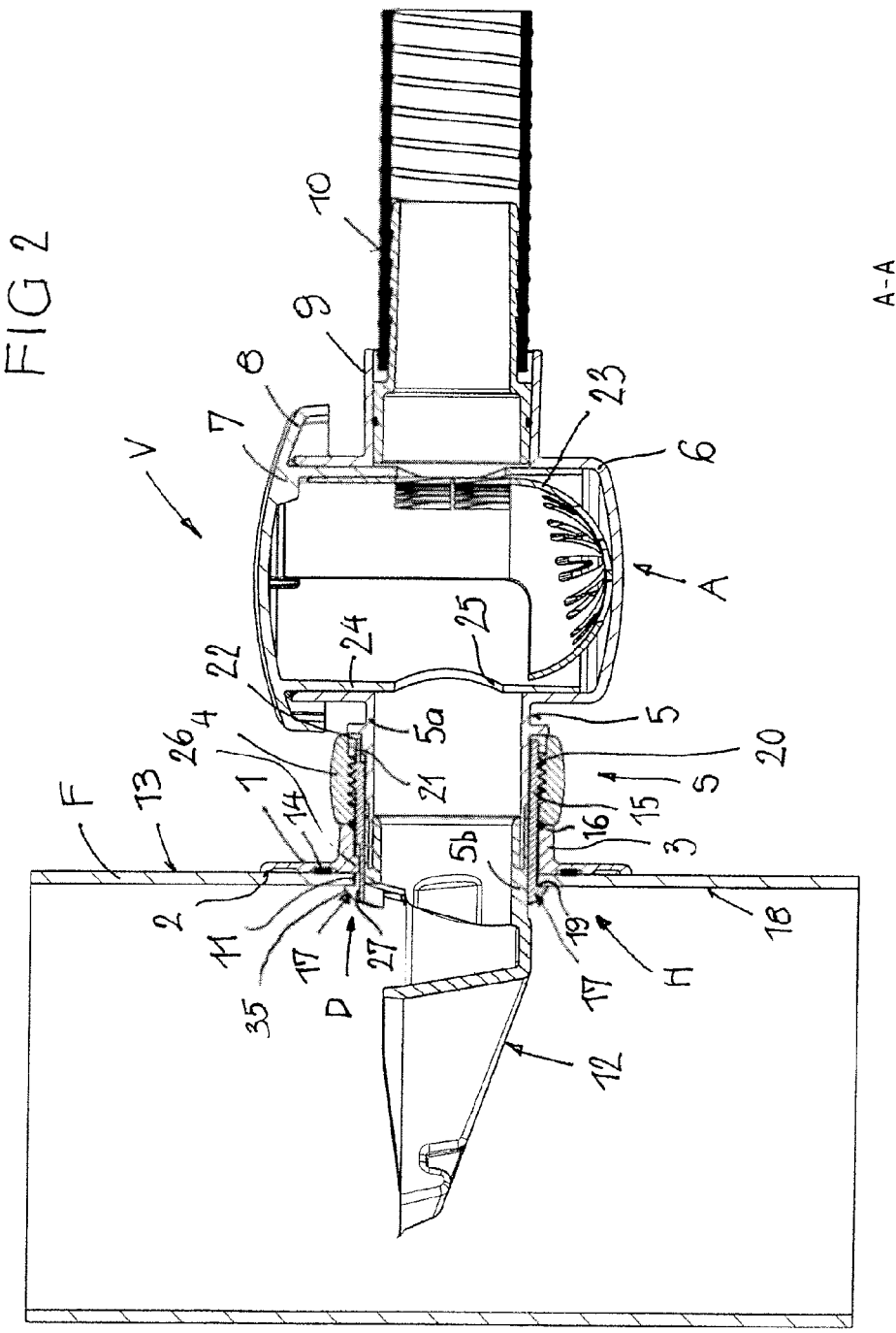
FIG. 2 is a sectional view of FIG. 1.
Figure 3:
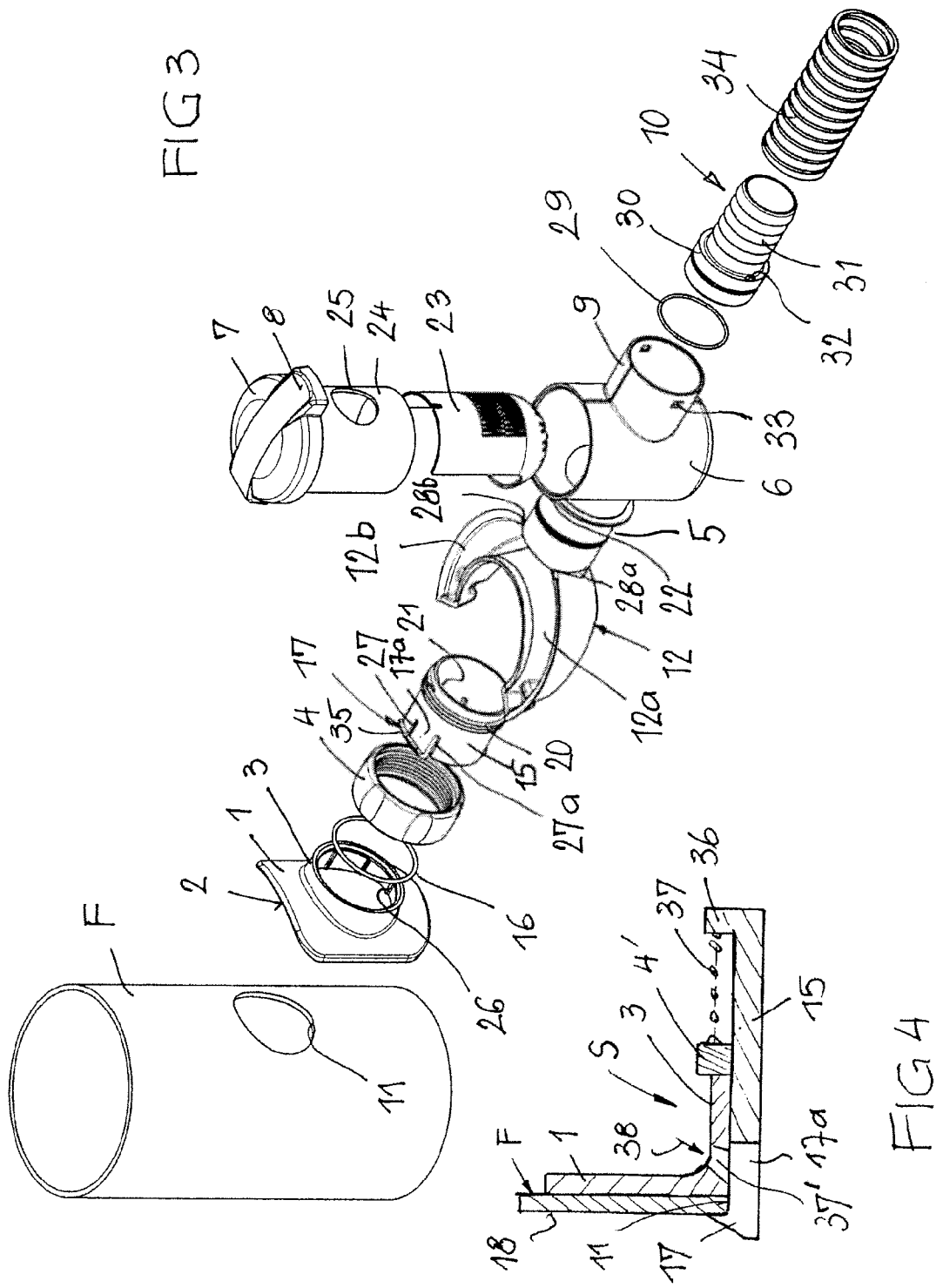
FIG. 3 is a perspective exploded view to clarify the individual parts of the device.

FIG. 2 shows with reference to FIG. 3 the individual components and the mode of assembly of the device V at the downpipe F.

An e.g. round mounting and branching opening 11 is formed in the downpipe F, this opening is for instance cut in by means of a circle cutter, through which opening the branch pipe 5 with a catching blade 12 ahead projects into the downpipe F. The catching blade 12 is elastically deformable and designed in a manner that it can be manually deformed to such an extent that it can be inserted through at least one opening 11 and automatically restores to the working position for catching rain water. The support member 1 rests with its concavely curved abutment surface 2 (if existing, possibly matching with the exterior curvature of an exterior surface 13 of the downpipe F) at the exterior surface 13 and seals via a seal 14 the area around the opening 11. The plug-in pipe is accommodated in a sleeve 15, which at its plug-in end comprises at least one undercut engagement hook 17. In a useful manner a plurality of engagement hooks 17 are provided in the circumferential direction, wherein each of the engagement hooks has a limited circumferential extension. At the front end of each engagement hook 17, an oblique or rounded insertion ramp 35 is attached. In the mounting position shown, each engagement hook 17 engages with its undercut 19 behind an interior wall 18 of the downpipe F in the area around the opening 11. The sleeve 15 is, suitably, sealed at the exterior side by a seal 16 arranged between the spigot nut 4 and the flanged socket 3. The spigot nut 4 has an internal thread, which is screwed onto the exterior thread section 20 of the sleeve 15 and tensions the engagement hooks 17 against the interior wall 18, whereas at the same time the spigot nut 4 is supported on the flanged socket 3 of the support member 1. Instead of the threaded connection, a bayonet connection could also be provided between the spigot nut 4 and the sleeve 15, wherein said bayonet connection can only be fastened or released via a partial rotation of the spigot nut 4.

Coupling elements 21, 22 that can be brought in mutual anti-rotation engagement are provided on the sleeve 15 and at the plug-in pipe, said coupling elements taking care for the anti-rotation effect of the branch pipe 5 with respect to the sleeve 15. The sleeve 15 is furthermore fixed by an anti-rotation device D incorporated into the retaining means H relative to the support member 1 or the downpipe F. The anti-rotation device D will be explained in detail by means of FIG. 3.

The branch pipe 5 in the embodiment of FIG. 2 is made of two pipe sections 5a, 5b telescopically plugged into each other, wherein the pipe section 5b comprises the catching blade 12, and the pipe section 5a comprises the filter and/or metering pot 6 and also the discharge piece 9. The branch pipe 5 could also be made of one piece.

The filter and/or metering device A is made of a pot 6, the lid 7 and a coarse filter element 23 optionally inserted into the pot 6 and/or a metering skirt 24 formed at the lid 7 and having metering passages 25. The metering passages 25 can be rotated by means of the lid 7 (rotation handle 8) relative to the branch pipe 5 in a manner that either a full passage position or any throttled intermediate position or a complete blocking position is given in which substantially no rain water is taken from the downpipe F.

The engagement hooks 17 shown in FIG. 2 in the mounting position and the anti-rotation device D can clearly be derived from FIG. 3. Each engagement hook 17 is integrally formed at a plug-in end of the sleeve 15 in FIG. 3, and this at a tongue 17a of the plug-in end, which is limited by two longitudinal slots 27, 27a and which is spring-elastic. At least one longitudinal rib 26 is protrudingly formed at the interior wall of a through opening in the support member 1 and/or the flanged socket 3, said longitudinal rib being insertable into one of the longitudinal slots 27 or 27a in order to support the mounted sleeve 15 with respect to the support member 1 against rotation. The support member 1, in case it is a planar plate, is either fixed via the frictional connection at the exterior surface of the downpipe F and/or through the partially cylindrical surface of the concavely curved abutment surface 2. Each longitudinal rib 26 can be positioned in a relative rotary position adapted to e.g. the abutment surface 2. Among the longitudinal ribs 26 (several longitudinal ribs can be provided in the circumferential direction) one rib either engages into a longitudinal slot 27a next to the engagement hook 17 or into a longitudinal slot 27 between two adjoining engagement hooks 17.

Each engagement hook can occupy in the circumferential direction e.g. 12% of the circumference of the sleeve 15. In the embodiment shown two engagement hook pairs are formed diametrically opposite at the plug-in end of the sleeve 15, which totally occupy approximately half of the circumference of the sleeve 15. One seal (not shown) each can also be provided between the pipe sections 5a, 5b of the branch pipe 5 and/or between the branch pipe 5 and the sleeve.

The catching blade 12 (FIG. 3) is formed sickle-shaped with two shell halves 12a, 12b, each of which being connected via a bending-notch zone 28a, 28b with the end of the plug-in pipe 5 so that the two shell halves 12a, 12b can conveniently be bent towards each other to such an extent that they are insertable through the sleeve 15 and the opening 11 and then automatically return into the working position shown in FIG. 3. Each shell half 12a, 12b can be formed with an inclination to the branch pipe 5 and extends in the height direction above a significant lower part of the circumference of the plug-in pipe 5 so that rainwater caught is discharged uniformly.

The discharge hose 10 is for instance composed of a hose connector 31 having a sealing collar 30 and locking elements 32 interacting with locking openings 33 in the discharge piece 9, wherein in this area a seal 29 can be inserted. A helical hose 34 is attached onto the hose connector 31, which is suitably ribbed, as shown in FIG. 2.

Figure 4:
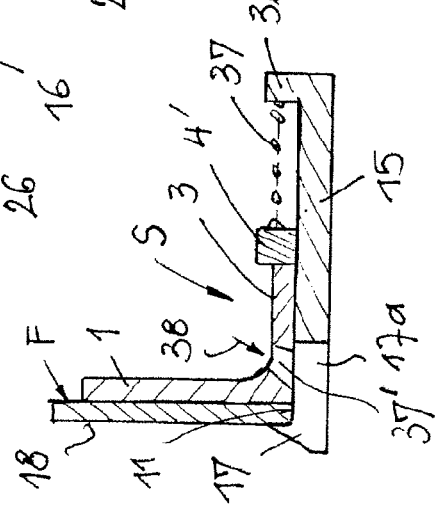
FIG. 4 is a partial section of a detail variant of the device mounted on the downpipe.

FIG. 4 shows a detail variant of the tensioning system S for mounting the device V. A tension spring arrangement 37, preferably in the pre-tensioned state, is provided in this tensioning system S between a support 36 of the sleeve 15 and an annular spring abutment 4'. The spring abutment 4' can be rested against the flanged socket 3 so that the tension spring arrangement 37 tensions the barbed hooks 17 passed through the opening 11 and reset towards the outside against the interior wall 18 of the downpipe F. After inserting the compressed catching blade 12 and the engagement hooks 17 through the opening 11 the device S is automatically fixed by means of the tension spring arrangement 37. In order to disassembly the device V, at least one passage 37' can be provided at the support member 1, through which by means of a tool (not shown) a force can be exerted onto the tongue 17a of the engagement hook 17 in the direction of arrow 38 to release this hook from its engagement and to be able to pull it out. In a further (not shown) detail variant the abutment surface 2 can substantially be planar and can comprise a seal 14 (or a plurality of such seals 14 in concentric arrangement), in order to properly seal and be positioned under the effect of the frictional connection of the tensioning system S at differently dimensioned downpipes. In this manner, one and the same device V can be used for different downpipe dimensions and also square downpipes. The engagement hooks 17 are suitably formed corresponding to the curvature of the interior wall 18 of the downpipe F so that they support over a possibly large circumferential portion of the opening. In a further alternative the sleeve 15 can be attached with an end-sided seal directly to the downpipe F, wherein the support member 1 could be omitted, or only the pipe socket 3 is used instead as a set ring.

While the present invention has been described with respect to several different embodiments, it will be appreciated by those skilled in the art that various modifications may be made without departing from the spirit and scope of the present invention.

What is claimed is:

1. Device for catching rainwater from a downpipe having a mounting and branching opening, wherein the device comprises:
a branch pipe with a water-catching blade at one end, a support member traversed by said branch pipe and a retaining means, coupled to said branch pipe, for fixing said branch pipe to the downpipe such that said branch pipe can be engaged into the mounting and branching opening and said support member is adapted to cover the downpipe in an area around the mounting and branching opening, wherein said retaining means comprises at least one undercut engagement hook disposed at a plug-in end of a sleeve accommodating said branch pipe, said at least one undercut engagement hook being adapted for being passed through the mounting and branching opening, an engagement hook tensioning system interconnected between said support member and said at least one undercut engagement hook, and said tensioning system comprises a spigot nut capable of being set onto said support member and engaging said sleeve via a connection; and
wherein said water-catching blade is a sickle-shaped shell comprising two recessed shell halves.

2. Device as claimed in claim 1, further comprising a form-fit branch pipe anti-rotation device in said engagement hook tensioning system.

3. Device as claimed in claim 2, wherein coupling elements are provided at said sleeve and said branch pipe forming said form-fit branch pipe anti-rotation device.

4. Device as in claim 1 wherein a filter and metering device is incorporated in said branch pipe,
wherein said filter and metering device has a skirt that is rotatable providing a full passage position, a throttled intermediate position, and a completely blocked position.

5. Device as claimed in claim 1, wherein said at least one undercut engagement hook is arranged at a tongue, which is restricted in the plug-in end of the sleeve on both sides by longitudinal slots.

6. Device as claimed in claim 1 wherein said support member comprises an abutment surface having substantially an outer curvature of the downpipe, and at a side opposing the abutment surface further comprising a pipe socket extending a through opening of said support member for receiving said sleeve, and that at an inner circumference of the pipe socket and/or the through opening of the support member at least one projection, preferably a longitudinal rib, which is arranged in a predetermined position relative to the abutment surface and can be engaged into a longitudinal slot for anti-rotation engagement.

7. Device as claimed in claim 1 wherein said at least one undercut engagement hook extends in a circumferential direction over approximately 12% of a circumference of said sleeve and has a curved course.

8. Device as claimed in claim 1 wherein said at least one undercut engagement hook comprises two diametrically opposing engagement hook pairs, which on a whole occupy approximately half of a circumference of said sleeve.

9. Device as claimed in claim 1, wherein the two recessed shell halves of said sickle-shaped shell is connected via a bending-notch structure with said branch pipe.

10. Device as claimed in claim 1 wherein:
said branch pipe comprises pipe sections telescopically plugged into each other.

11. Device for catching rainwater from a downpipe having a mounting and branching opening, wherein the device comprises:
a branch pipe with a water-catching blade at one end, a support member traversed by said branch pipe and a retaining means, coupled to said branch pipe, for fixing said branch pipe to the downpipe such that said branch pipe can be engaged into the mounting and branching opening and said support member is adapted to cover the downpipe in an area around the mounting and branching opening, wherein said retaining means comprises at least one undercut engagement hook disposed at a plug-in end of a sleeve accommodating said branch pipe, said at least one undercut engagement hook being adapted for being passed through the mounting and branching opening, an engagement hook tensioning system interconnected between said support member and said at least one undercut engagement hook, and
a tensioning system comprising a support and a spring abutment placed on said sleeve separated by a spring,
whereby when said at least one undercut engagement hook is passed through the mounting and branching opening of the downpipe said at least one undercut engagement hook is tensioned against an interior wall of the downpipe fixing the device to the downpipe.

12. Device for catching rainwater from a downpipe having a mounting and branching opening comprising:
a branch pipe;
a sickle shaped water-catching blade having two recessed shell halves attached to one end of said branch pipe;
a sleeve placed around said branch pipe;
a support member having an opening traversed by said branch pipe and said sleeve; and
retaining means, coupled to said branch pipe and said sleeve, for attaching the device to the downpipe,
whereby said sickle shaped water-catching blade and said branch pipe may be placed through the mounting and branching opening of the downpipe and said sickle shaped water-catching blade positioned to catch rainwater flowing in the downpipe diverting the rainwater to said branch pipe.

13. The device for catching rainwater from a downpipe as in claim 12 further comprising:
a bending-notch zone connecting the two shell halves of said sickle shaped water-catching blade,
whereby the two shell halves can be bent towards each other to such an extent that they are insertable through said sleeve and the mounting and branching opening and returned into a working position.

* * * * *